(12) United States Patent
Jahnke et al.

(10) Patent No.: US 7,247,281 B2
(45) Date of Patent: Jul. 24, 2007

(54) METHANATION ASSEMBLY USING MULTIPLE REACTORS

(75) Inventors: Fred C. Jahnke, Rye, NY (US); Sanjay C. Parab, West Hartford, CT (US)

(73) Assignee: FuelCell Energy, Inc., Danbury, CT (US)

(*) Notice: Subject to any disclaimer, the term of this patent is extended or adjusted under 35 U.S.C. 154(b) by 411 days.

(21) Appl. No.: 10/818,680

(22) Filed: Apr. 6, 2004

(65) Prior Publication Data

US 2005/0226792 A1    Oct. 13, 2005

(51) Int. Cl.
*B01J 8/04* (2006.01)
*C10J 3/16* (2006.01)

(52) U.S. Cl. ............ 422/190; 48/202; 48/197 R; 48/210; 518/707

(58) Field of Classification Search .......... 48/202, 48/197 R, 210; 518/707; 422/190
See application file for complete search history.

(56) References Cited

U.S. PATENT DOCUMENTS

| | | | |
|---|---|---|---|
| 3,967,936 A | 7/1976 | Tajbl et al. | |
| 3,996,014 A * | 12/1976 | Muller et al. | 422/191 |
| 4,005,996 A * | 2/1977 | Hausberger et al. | 48/197 R |
| 4,016,189 A | 4/1977 | Muller et al. | |
| 4,028,067 A | 6/1977 | Gent | |
| 4,064,156 A * | 12/1977 | McRobbie | 518/706 |
| 4,133,825 A | 1/1979 | Stroud et al. | |
| 4,205,961 A | 6/1980 | Moller et al. | |
| 4,235,044 A | 11/1980 | Cheung | |
| 4,298,694 A | 11/1981 | Skov | |
| 4,525,482 A * | 6/1985 | Ohsaki et al. | 518/707 |
| 5,071,719 A * | 12/1991 | Rostrup-Nielsen et al. | 429/19 |
| 5,356,530 A * | 10/1994 | Calderon | 208/108 |
| 6,207,307 B1 | 3/2001 | Van Keulen | |
| 6,403,049 B1 | 6/2002 | Van Keulen et al. | |

* cited by examiner

*Primary Examiner*—N. Bhat
(74) *Attorney, Agent, or Firm*—Cowan, Liebowitz & Latman, P.C.

(57) ABSTRACT

A methanation assembly for use with a water supply and a gas supply containing gas to be methanated in which a reactor assembly has a plurality of methanation reactors each for methanating gas input to the assembly and a gas delivery and cooling assembly adapted to deliver gas from the gas supply to each of said methanation reactors and to combine water from the water supply with the output of each methanation reactor being conveyed to a next methanation reactor and carry the mixture to such next methanation reactor.

28 Claims, 1 Drawing Sheet

METHANATION ASSEMBLY USING MULTIPLE REACTORS

STATEMENT AS TO RIGHTS TO INVENTIONS MADE UNDER FEDERALLY SPONSORED RESEARCH AND DEVELOPMENT

This invention was made with Government support under contract DOE Contract No.: DE-FC21-95MC31262/Subcontract No. 2000-01 with Kentucky Pioneer Energy, LLC. The Government has certain rights in the invention.

BACKGROUND OF THE INVENTION

This invention relates to methanation of synthesis gas and, in particular, to a methanation assembly using multiple reactors for controlled methanation.

Methanation reactions have been well known for more than 70 years and have been applied in a variety of industrial processes, including ammonia synthesis, hydrogen plant purification and production of substitute natural gas from a variety of feedstocks. Methanation is generally used as a gas purification process to remove traces of carbon oxides from gases, such as synthesis gas ("syngas"). In addition, methanation has been used to produce synthetic natural gas (methane) and can be used to convert syngas to produce methane-containing syngas suitable for use in conventional fuel cell assemblies.

Particularly, methanation of syngas involves a reaction between carbon oxides, i.e. carbon monoxide and carbon dioxide, and hydrogen in the syngas to produce methane and water, as follows:

$$CO + 3H_2 \rightarrow CH_4 + H_2O \quad (1)$$

$$CO_2 + 4H_2 \rightarrow CH_4 + 2H_2O \quad (2)$$

Methanation reactions (1) and (2) take place at around 300° C. in a methanation reactor filled with a nickel containing catalyst and are strongly exothermic. Generally, the temperature increase in a typical methanator gas composition used in a hydrogen plant is about 74° C. for each 1% of carbon monoxide converted and 60° C. for each 1% carbon dioxide converted.

As can be appreciated, because of the exothermic nature of methanation reactions (1) and (2), the temperature in the methanation reactor during methanation of syngas has to be controlled to prevent overheating of the reactor catalyst. Also high temperatures are undesirable from an equilibrium standpoint and reduce the amount of conversion of syngas to methane since methane formation is favored at lower temperatures. Formation of soot on the reactor catalyst is also a concern and requires the addition of water to the syngas. Further, in some types of fuel cell applications, the fuel cells require that the methane reforming be done in the fuel cell stack. The endothermic methane reforming heat promotes stack heat management, reduces fresh air requirements and improves overall power plant efficiency.

Accordingly, various conventional methods have been proposed in order to control the temperature of methanation reactions. In particular, conventional assemblies using multiple methanation reactors connected in series have been used in order to limit the temperature rise during exothermic methanation reactions. For example, U.S. Pat. No. 3,967,936 teaches the use of two or more methanation reaction zones connected in series and a plurality of quench zones situated between the reaction zones such that a mixture of feed gas and cold recycle gas is delivered to the quench zones for quenching of effluent gas that emerges from each of the reaction zones. In addition, U.S. Pat. No. 4,205,961 discloses a methanation assembly for methanation of synthesis gas including two high-temperature methanation reactors connected in series followed by two low-temperature methanation reactors also connected in series. In this case, boilers and heat exchangers fed with water are used to cool through heat exchange the effluent leaving one reactor and being fed to another reactor.

Conventional methanation methods have also used multiple methanation reactors connected in series and in parallel to process two or more feed gas streams. For example, U.S. Pat. No. 4,298,694 discloses a catalytic methanation process where a feed gas rich in carbon oxides is divided into two part streams, such that the first part stream is methanated in a first methanation reactor, and the cooled effluent from the first reactor is combined with the second part stream and is methanated in a second methanation reactor. The process disclosed in the '694 patent uses a heat exchanger supplied with saturated steam to cool the effluent exiting from the first reactor.

As can be appreciated, conventional methods of controlling temperature during methanation reactions require use of complex equipment including multiple heat exchangers and gas recycling components to cool the effluent gas and to prevent overheating of the methanation reactors. Additionally, conventional methanation methods have dealt with controlling soot formation on the methanation catalyst within the methanation reactor by adding steam to the reactants going to the first reactor.

It is therefore an object of the present invention to provide a methanation assembly using multiple methanation reactors with improved temperature control to produce a gas having a desired temperature and methane composition.

It is a further object of the present invention to provide a methanation assembly using multiple methanation reactors and direct water injection as a cooling medium to control the temperature in the methanation reactors as well as to avoid deposition of soot on the methanation catalyst.

SUMMARY OF THE INVENTION

In accordance with the principles of the present invention, the above and other objectives are realized in methanation assembly for use with a water supply and a gas supply containing gas to be methanated and in which a reactor assembly has a plurality of methanation reactors each for methanating gas input to the assembly and a gas delivery and cooling assembly adapted to deliver gas from the gas supply to each of the methanation reactors and to combine water from the water supply with the output of each methanation reactor being conveyed to a next methanation reactor and to carry the mixture to such next methanation reactor. In further accord with the invention, the gas delivery and cooling assembly is further adapted to combine water from the water supply with gas from the gas supply being delivered to the first of said methanation reactors of said plurality of methanation reactors.

In the embodiment of the invention disclosed hereinbelow, three methanation reactors are employed and the gas delivery and cooling assembly includes one or more water injection units, one or more gas dividing units, one or more water routing units and connecting lines connecting these units.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
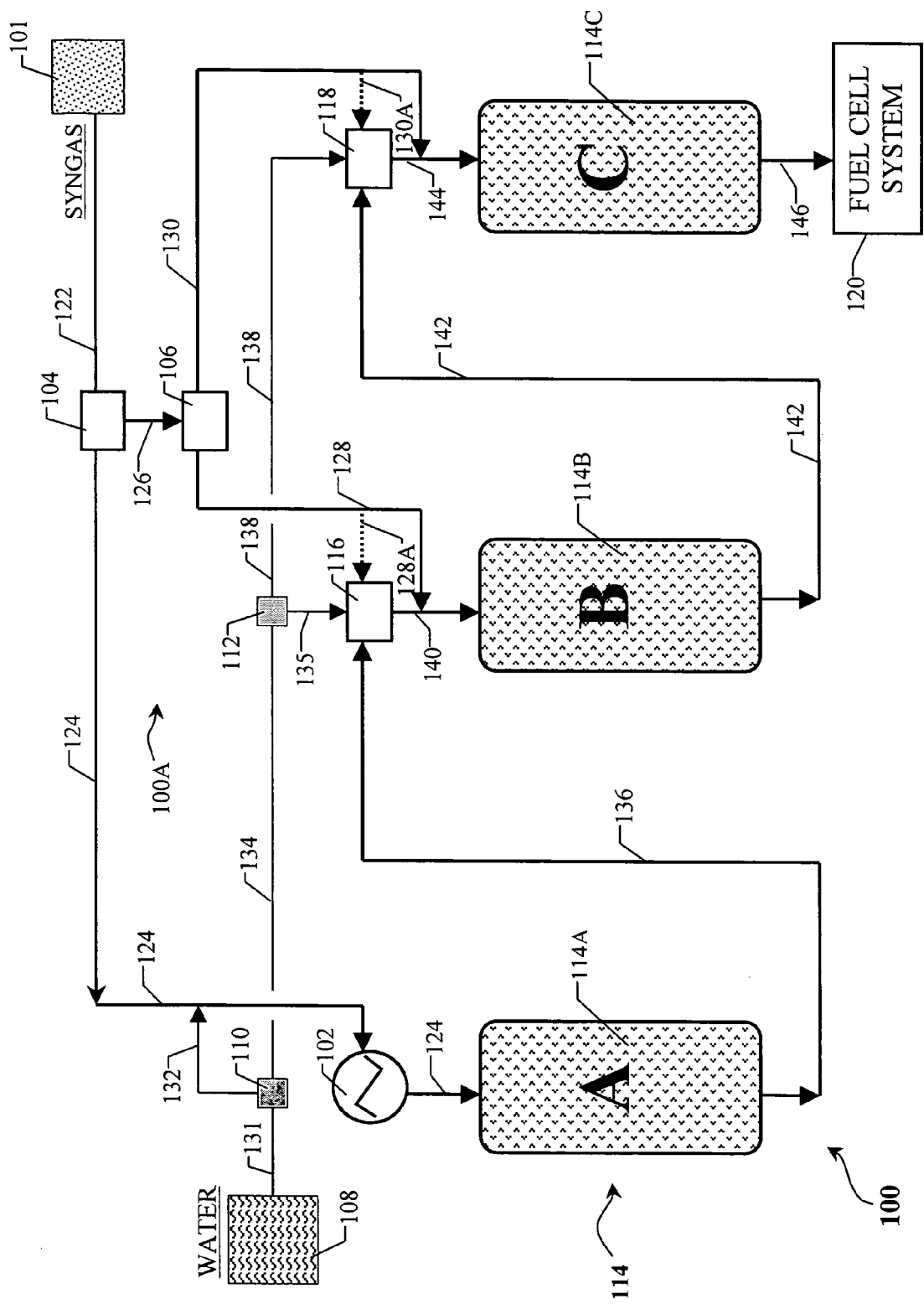
FIG. 1 shows a methanation assembly in accordance with the principles of the present invention.

FIG. 1. illustrates a methanation assembly 100 in accordance with the principles of the present invention. A syngas supply 101 and a cooling fluid of water supply 108 deliver syngas and water to the methanation assembly 100 and, in turn, the assembly 100 produces methanated syngas for delivery to a fuel cell system 120.

As shown, the assembly 100 comprises a methanation reactor assembly 114 which includes a series of three adiabatic methanation reactors 114A, 114B and 114C. Each of these reactors is configured to react carbon oxide and hydrogen contained in the syngas in the presence of a catalyst to produce methane and water, in accordance with the reactions (1) and (2) set forth hereinabove.

As is also shown in FIG. 1 and, in accordance with the invention, the methanation assembly 100 further includes a gas delivery and cooling assembly 100A which is adapted to deliver syngas and cooling fluid from the syngas supply 101 and the water supply 108 to the three methanation reactors 114A-114C so as to maintain a predetermined temperature of the streams entering and leaving the reactors. More particularly, the assembly 100A is adapted to divide or segment the syngas from the syngas supply 101 into parts or streams and to convey each stream to a different one of the methanation reactors 114A-114C for undergoing partial methanation. Additionally, the assembly 100A is further adapted to combine water from the supply 108 with the output of each reactor being conveyed to a next reactor to cool the output and to carry the resultant combination or mixture to such next reactor.

In the case shown in FIG. 1, three part streams of syngas are produced, each being carried to a different one of the methanation reactors 114A-114C. The portion of the water supply and syngas fed to the first methanation reactor 114A are first heated in an exchanger (syngas heater) and the partially methanated syngas output from the first methanation reactor 114A is combined with water and additional syngas and the mixture is carried to the second or next reactor 114B, while the partially methanated syngas output from the second methanation reactor 114B is combined with water and additional syngas and the mixture is carried to the third or next methanation reactor 114C.

Each of the methanation reactors 114A-114C includes a catalyst for promoting methanation reactions between carbon oxides and hydrogen in the syngas. Although nickel catalysts are most commonly used in promoting methanation reactions, such catalysts have certain disadvantages, including, but not limited to, thermal and chemical sintering. Accordingly, in order to ensure efficient performance of the methanation assembly 100, catalysts having a high nickel concentration, i.e. greater than 50% nickel, are preferred for the reactors 114A-114C. Such catalysts are typically stable against thermal and chemical sintering during methanation of undiluted syngas streams. Alternatively, other stable catalysts which are active and selective towards methane may be used in the methanation reactors.

The gas delivery and cooling assembly 100A functions as described above by including in the assembly a syngas heater 102, first and second syngas stream dividing units 104 and 106, first and second water routing units 110 and 112, first and second water injection units 116 and 118 and connecting conduits or lines 122-146. As shown in FIG. 1, connecting line 122 carries carbon oxide-containing syngas from the supply 101 to the first syngas dividing unit 104. Also, as shown, connecting line 131 carries water from the water supply 108 to the water routing unit 110.

In the water routing unit 110, the received water is split or divided into two part water streams, i.e. a first water stream which is routed through a line 132 and a second water stream which is routed through a line 134. Similarly, syngas from the syngas supply 101 is divided by the first syngas stream dividing unit 104 into two syngas part streams. A first syngas stream is guided through a line 124 while a second syngas stream is guided through a line 126 which is coupled to the second syngas dividing unit 106.

The second syngas stream received in the second syngas dividing unit 106 is further divided by this unit into two additional streams, i.e. third and a fourth syngas streams. The third and fourth syngas streams are coupled by the dividing unit to lines 128 and 130, respectively.

Similarly, the second stream of water from the first water routing unit 110 is carried by a line 134 to the second water routing unit 112. The second water routing unit 112 further divides the second stream of water into third and a fourth water streams coupled to lines 135 and 138, respectively.

Returning to the first syngas stream traveling through the line 124, it receives the first stream of water carried through the line 132. The amount of water in this stream is determined so that a steam to carbon ratio is maintained to prevent soot formation and is a direct function of the feed or syngas stream composition. The combination of first syngas stream and first water stream then passes through the heat exchanger 102 where it is heated to approximately 500° F. and forms a mixture of syngas and steam. If the methanation assembly 100 is used in combination with a fuel cell system 120, as illustrated in FIG. 1, heat from a fuel cell cathode exhaust (not shown) may be used to heat the combination of syngas and water in the heat exchanger 102.

The resulting mixture of syngas and steam is carried further through the line 124 to the first methanation reactor 114A, where syngas is partially methanated by reacting a portion of the carbon oxides and hydrogen present in the syngas in the presence of a catalyst. As a result of the exothermic methanation reaction of the syngas in the first reactor 114A, the partially methanated syngas output exits the reactor 114A through a line 136 and has a temperature of approximately 1000° F.

The line 136 carries the heated partially methanated syngas output from the methanation reactor 114A to the first water injection unit 116 which also receives the third water stream in line 135. In this unit, the hot syngas output is cooled by the vaporization of the third water stream and the cooled output containing a mixture or combination of partially methanated syngas and steam is passed to the connecting line 140 which also receives the third syngas stream from the connecting line 128. It is important that the next stage syngas is added after the water injection to avoid soot formation. The third syngas stream provides more syngas reactant and also further cools this output and the resultant mixture of cooled partially methanated syngas, steam and fresh syngas at a resultant reduced temperature of approximately 450° F., is then coupled by the line 140 to the second methanation reactor 114B.

In this reactor, the mixture of methanated syngas, steam and fresh syngas is further partially methanated in the presence of a catalyst. A further partially methanated syngas output then exits the second methanation reactor 114B through a line 142 and has a temperature of approximately 1000° F.

As shown in FIG. 1, the output from the second methanation reactor 114B and the fourth water stream from the second water routing unit 112 are carried to the second water injection unit 118 by their respective lines 142 and 138. In the second water injection unit 118, the second reactor output and the fourth water stream are combined or mixed to cool the output and result in a further reduced temperature mixture of partially methanated syngas and steam which is delivered to the line 144. This line also receives the fourth syngas stream from the line 130 which provides further reactant and cooling and results in an output stream in the line 144 of partially methanated syngas, steam and fresh syngas at an approximate temperature of 450° F.

In the third methanation reactor 114C, the syngas and steam mixture is further methanated in the presence of a catalyst so as to convert additional carbon oxides and hydrogen present in the syngas to methane and water. Methanated syngas comprising methane and unconverted syngas exits the reactor 114C through a line 146 and has an approximate temperature of 900° F. The methanated syngas exiting from the third reactor 114C is then fed to the fuel cell system 120, where it is converted into fuel gas for the anodes of the fuel cells of the system.

In the system 100 of FIG. 1, the third and fourth syngas streams were coupled to the lines 140 and 144 feeding the reactors 114B and 114C. Alternatively, the streams could have been fed directly to the water injection units 116 and 118, respectively, as shown in dotted line by the lines 128A and 130.

As can be appreciated from the above and as shown in the examples discussed below, the inlet and outlet temperatures of the streams entering and exiting methanation reactors 114A-114C can be controlled by varying the percentage of the total fresh syngas being delivered to each of the reactors 114A-114C and the percentage of the total water being routed by the water routing units 110 and 112 to the water injection units 116 and 118. Two examples which illustrate this control are described below.

EXAMPLE 1

In this example, approximately one third of the total syngas delivered from the syngas supply 101 and approximately 55% of the total water from the water supply 108 are mixed and fed to the first methanation reactor 114A, at a temperature of 500° F. and a pressure of 35 psia.

Partially methanated syngas leaving the first methanation reactor 114A comprises approximately 7 mole percent of methane on a dry basis, and has a temperature of approximately about 1014° F. This partially methanated syngas is mixed in the water injection unit 116 with the third water stream comprising approximately 22.5% of the total amount of water delivered to the assembly 100. The resulting mixture of partially methanated syngas and water is cooled in the water injection unit 116, and thereafter mixed with the third syngas stream carried from the second syngas dividing unit 106. The third syngas stream comprises approximately one third of the total syngas. The resulting syngas and steam mixture is carried to the second reactor 114B and has a temperature of about 467° F.

The further methanated syngas leaving the second methanation reactor 114B comprises approximately 12 mole percent of methane on dry basis and has an outlet temperature of approximately 964° F. This partially methanated syngas is cooled in the second water injection unit 118 by adding the fourth water stream comprising approximately 22.5% of the total water delivered to the assembly 100. Before entering the third methanation reactor 114C, the mixture of partially methanated syngas and water is combined with the fourth syngas stream comprising the remainder of the total syngas delivered to the assembly, i.e. approximately one third of the total syngas. The inlet temperature of the gas mixture entering the third methanation reactor 114C is about 584° F. After undergoing methanation in the third reactor 114C, methanated syngas leaves the reactor 114C at a temperature of approximately 947° F. and has a composition of approximately 14 mole percent methane on dry basis. This syngas may then be carried to the fuel cell system 120 where it is used as fuel for the anodes of the fuel cells of the system.

EXAMPLE 2

In this example, syngas delivered from the syngas supply 101 is divided in the first syngas dividing unit 104 so that approximately 40% of the total syngas is delivered to the first methanation reactor 114A. The second syngas dividing unit 106 further divides the remaining 60% of the syngas equally, with 30% of the total syngas to be carried to the second methanation reactor 114B and 30% of the total syngas to be carried to the third methanation reactor 114C. Water delivered from the water supply 108 is divided by the water routing units 110 and 112 so that a mole ratio of water versus carbon (from carbon monoxide and methane) is maintained at 3.2 or higher. The maximum operating temperature of the methanation reactors 114A-114C in this example is 1002° F. and the final methane content is 15.1 vol % (dry basis).

The above-described examples of syngas and water distribution may be used in the methanation assembly arrangement of FIG. 1, both in the case of syngas being delivered to the connecting lines following the water injection units 116 and 118 and in the case of syngas being delivered directly to the water injection units. In addition, syngas delivered to the methanation assembly 100 from the supply 101 may be pre-treated to eliminate sulfur-containing compounds before entering the assembly 100.

It should be noted that the systems in the examples above were operated at low pressure consistent with the low pressure of the fuel cells. However, it is contemplated that the system of the invention can be operated at high pressures as well. High pressure operation may be preferable in certain situations as equilibrium at higher pressure favors methane production.

It should additionally be noted that while the system of FIG. 1 shows the use of three methanation reactors, the invention is intended also to cover systems in which two or more reactors are used. The number of reactors used and the desired division of the supply gas and water supply will, of course, depend on the system requirements and particular application.

In general terms, increasing the number of reactors reduces the average reactor outlet temperature which increases the conversion of methane and reduces the amount of heat required to preheat the reactants entering the first reactor. Also, the total amount of water added is determined by the amount of water needed to avoid soot formation. In particular, to avoid soot formation, water must be added to the reaction gas in the proper ratio. This is especially important when the hot gas is passed over a catalyst which may be deactivated by soot. Therefore, all of the syngas cannot be added to the first reactor, but part of the syngas must be added after additional water is added for cooling.

Generally, the syngas is split evenly to each reactor. Additionally, the water is also split roughly evenly to each reactor, but some higher fraction of water may be added to the first reactor to control the temperatures of the reactors in the desired range.

In all cases it is understood that the above-described arrangements are merely illustrative of the many possible specific embodiments which represent applications of the present invention. For example, additional methanation reactors may be used in the methanation assembly with the syngas and water streams being further divided to provide syngas and water streams to such additional reactors. Moreover, the division of syngas and water among the reactors may be varied in order to maintain the desired temperature of the methanation reactors and the composition of the partially methanated syngas. Numerous and varied other arrangements can be readily devised in accordance with the principles of the present invention without departing from the spirit and scope of the invention.

What is claimed is:

1. A methanation assembly responsive to a gas supply containing gas to be methanated and a water supply comprising;
   a reactor assembly including a plurality of methanation reactors each for methanating gas input to the assembly;
   a gas delivery and cooling assembly adapted to deliver gas from said gas supply to each of said methanation reactors and to combine a cooling liquid comprising water from said water supply with the output of each methanation reactor being conveyed to a next methanation reactor, without cooling said output of each methanation reactor before combining said output with said cooling liquid, and to carry the mixture to such next methanation reactor.

2. A methanation assembly in accordance with claim 1, wherein:
   said gas delivery and cooling assembly is further adapted to combine water from said water supply with the gas from said gas supply being delivered to the first of said methanation reactors of said plurality of methanation reactors.

3. A methanation reactor in accordance with claim 1, wherein:
   said gas delivery and cooling assembly is further adapted to heat said mixture of water and gas.

4. A methanation assembly in accordance with claim 1, wherein:
   said gas delivery and cooling assembly delivers gas from said gas supply to each next methanation reactor by adding the gas to the mixture being conveyed to said next methanation reactor one of after said mixture has been formed and as said mixture is being formed.

5. A methanation assembly according to claim 4, wherein:
   said gas delivery and cooling assembly comprises: one or more water injection units, each of said water injection units combining water from said water supply and the output of a methanation reactor which cools the mixture being conveyed to a next methanation reactor.

6. A methanation assembly in accordance with claim 5, wherein;
   said gas delivery and cooling assembly further comprises: one or more gas dividing units for dividing gas from said gas supply into a plurality of gas streams, each of said gas streams for delivery to a different one of said methanation reactors.

7. A methanation assembly in accordance with claim 6, wherein:
   said gas delivery and cooling assembly further comprises: one or more connecting lines, each connecting line connecting a water injection unit to a different one of said methanation reactors.

8. A methanation assembly in accordance with claim 7, wherein:
   each of a number of said gas streams is conveyed to a methanation reactor by delivery to one of said connecting lines.

9. A methanation assembly in accordance with claim 8, wherein: said gas delivery and cooling assembly further comprises: a further connecting line connected to a first of said methanation reactors of said plurality of methanation reactors, and one of said gas streams of said plurality of gas streams is conveyed to said first methanation reactor by delivery to said further connecting line;
   and said gas delivery and cooling assembly is further adapted to convey water from said water supply to said further connecting line.

10. A methanation assembly in accordance with claim 9, wherein:
    said gas delivery and cooling assembly further comprises a heat exchanger for heating the mixture of water and gas in said further connecting line.

11. A methanation assembly in. accordance with claim 10, wherein:
    the number of methanation reactors is three.

12. A methanation assembly in accordance with claim 7, wherein:
    each of a number of said gas streams is conveyed to a methanation reactor by delivery to a different one of said cooling assemblies.

13. A methanation assembly in accordance with claim 12, wherein:
    said gas delivery and cooling assembly further comprises: a further connecting line connected to a first of said methanation reactors of said plurality of methanation reactors, and one of said gas streams of said plurality of gas streams is conveyed to said first methanation reactor by delivery to said further connecting line;
    and said gas delivery and cooling assembly is further adapted to convey water from said water supply to said further connecting line.

14. A methanation reactor in accordance with claim 13, wherein:
    said gas delivery and cooling assembly further comprises a heat exchanger for heating the mixture of water and gas in said further connecting line.

15. A methanation assembly in accordance with claim 14, wherein:
    the number of methanation reactors is three.

16. A methanation assembly in accordance with claim 1, wherein the gas is syngas.

17. A methanation assembly in accordance with claim 1, wherein each of said methanation reactors includes a catalyst.

18. A methanation assembly in accordance with claim 17, wherein said catalyst comprises nickel.

19. A methanation assembly in accordance with claim 18, wherein said catalyst has greater than 50% nickel concentration.

20. A methanation assembly in accordance with claim 1, wherein:
said assembly comprises three methanation reactors.

21. An apparatus comprising:
a methanation assembly for use with a water supply and a gas supply containing gas to be methanated, said methanation assembly comprising: a reactor assembly including a plurality of methanation reactors each for methanating gas input to the assembly; and a gas delivery and cooling assembly adapted to deliver gas from said gas supply to each of said methanation reactors and to combine a cooling liquid comprising water from said water supply with the output of each methanation reactor being conveyed to a next methanation reactor without cooling said output from each methanation reactor before combining said output with said cooling liquid, and to carry the mixture to such next methanation reactor;
and a fuel cell system for receiving the output of said methanation assembly.

22. An apparatus in accordance with claim 21, wherein:
said gas delivery and cooling assembly is further adapted to combine water from said water supply with the gas from said gas supply being delivered to the first of said methanation reactors of said plurality of methanation reactors.

23. An apparatus in accordance with claim 22, wherein:
said gas delivery and cooling assembly is further adapted to heat said combination of water and gas.

24. An apparatus in accordance with claim 23, wherein:
the number of methanation reactors is three.

25. An apparatus in accordance with claim 21, wherein the gas is syngas.

26. An apparatus in accordance with claim 21, wherein each of said methanation reactors includes a catalyst.

27. An apparatus in accordance with claim 26, wherein said catalyst comprises nickel.

28. An apparatus in accordance with claim 27, wherein said catalyst has greater than 50% nickel concentration.

* * * * *